US008281117B2

(12) United States Patent
Altstaedt et al.

(10) Patent No.: US 8,281,117 B2
(45) Date of Patent: Oct. 2, 2012

(54) METHOD AND A MEMORY UNIT FOR BOOTING A SERVER BY COPYING BOOT DATA FROM AN EXCHANGEABLE MEMORY UNIT TO PRIMARY HARD DISK OF THE SERVER

(75) Inventors: Kai Altstaedt, Schenefeld (DE); Andrew Siems, Drochtersen (DE)

(73) Assignee: Airbus Operations GmbH, Hamburg (DE)

( * ) Notice: Subject to any disclaimer, the term of this patent is extended or adjusted under 35 U.S.C. 154(b) by 466 days.

(21) Appl. No.: 12/565,218

(22) Filed: Sep. 23, 2009

(65) Prior Publication Data

US 2010/0077195 A1 Mar. 25, 2010

Related U.S. Application Data

(60) Provisional application No. 61/194,088, filed on Sep. 24, 2008.

(51) Int. Cl.
  *G06F 9/00* (2006.01)
  *G06F 9/24* (2006.01)
  *G06F 13/00* (2006.01)
(52) U.S. Cl. ................ 713/2; 713/1; 711/162
(58) Field of Classification Search ............... 713/1, 2
  See application file for complete search history.

(56) References Cited

U.S. PATENT DOCUMENTS

| 6,411,552 | B1 * | 6/2002 | Chiba .................. 365/185.33 |
| 7,293,166 | B2 * | 11/2007 | Nguyen et al. ................ 713/1 |
| 7,787,297 | B2 * | 8/2010 | Jeon et al. ............... 365/185.05 |
| 7,930,531 | B2 * | 4/2011 | Chow et al. ...................... 713/2 |
| 2005/0005076 | A1 * | 1/2005 | Lasser ....................... 711/154 |
| 2007/0244941 | A1 | 10/2007 | Reed et al. |
| 2008/0082813 | A1 * | 4/2008 | Chow et al. ...................... 713/2 |
| 2009/0013165 | A1 * | 1/2009 | Chow et al. ...................... 713/2 |

FOREIGN PATENT DOCUMENTS

| EP | 0 449 530 A2 | 10/1991 |
| WO | WO 01/09722 A1 | 2/2001 |
| WO | WO 2005/079326 A2 | 9/2005 |

* cited by examiner

*Primary Examiner* — Suresh Suryawanshi
(74) *Attorney, Agent, or Firm* — Jenkins, Wilson, Taylor & Hunt, P.A.

(57) ABSTRACT

The invention relates to a server with at least one removable storage unit. This removable storage unit is designed to boot a server. The removable storage unit, which is for example a memory card, comprises a non-writable storage, which stores a boot-loader and reference installation files, and a writable secondary storage, which is designed to store installation files. The boot-loader checks a data content of the secondary storage and a data content of a primary storage of the server. In case the secondary storage is not empty and the primary storage is either empty or comprises a different data content than the secondary storage, the boot-loader stores the data content of the secondary storage in the primary storage of the server.

15 Claims, 3 Drawing Sheets

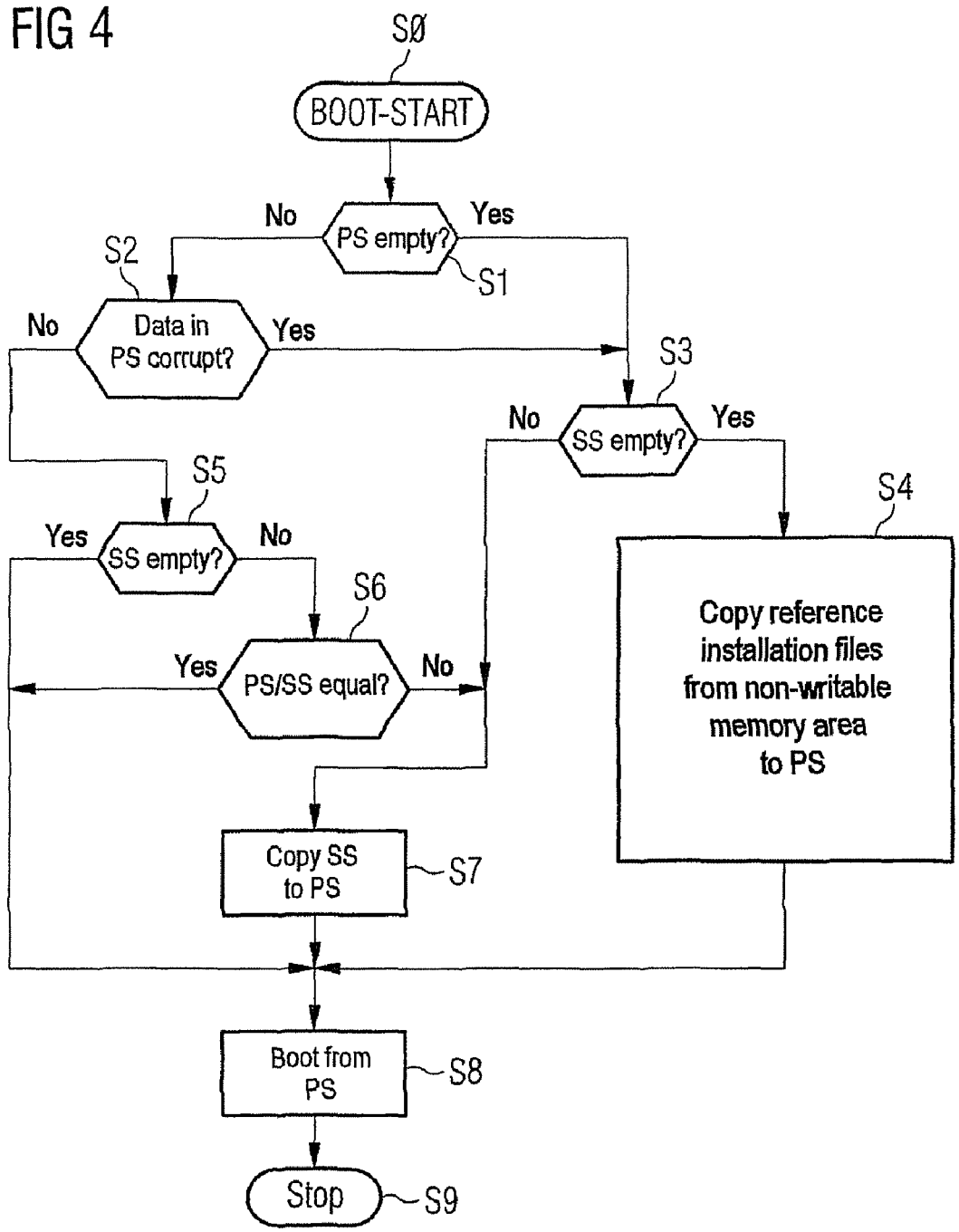

METHOD AND A MEMORY UNIT FOR BOOTING A SERVER BY COPYING BOOT DATA FROM AN EXCHANGEABLE MEMORY UNIT TO PRIMARY HARD DISK OF THE SERVER

CROSS-REFERENCE TO RELATED APPLICATIONS

This application claims the benefit of U.S. Provisional Application No. 61/194,088 filed Sep. 24, 2008, the entire disclosure of which is herein incorporated by reference.

BACKGROUND OF THE INVENTION

The invention relates to an exchangeable memory unit and a method for booting a server, particularly an aircraft server, and also to a server having an exchangeable memory unit.

When a computer has been switched on, an operating system is loaded. The starting or starting-up of the computer is also called booting. In a conventional boot operation, a processor starts at a stipulated address to execute a BIOS (Basic Input Output System) stored in a non-volatile memory. The BIOS is a firmware program which is stored in a non-volatile memory, for example in a ROM store, and which is executed immediately after the computer is switched on. The BIOS performs various functions, such as a self-test for the connected appliances (POST: Power On Self Test) or initialization of the hardware. In addition, the BIOS establishes the data storage medium from which the operating system can be booted. Next, the BIOS loads what is known as a bootloader from this data storage medium. The bootloader or the bootloader program loads the rest of the software of the operating system, with the bootloader either immediately loading the operating system stored on the relevant data medium or providing a menu for the purpose of selecting an operating system as what is known as a boot manager.

In the case of the conventional approach to booting the computer, the operating system and the bootloader program or the bootloader are located in a primary memory (primary repository), which is normally the hard disk of the computer. In this case, the BIOS program accesses the hard disk directly, with the bootloader which is on the hard disk being executed by the processor. If the computer, which may be a server, for example, is faulty, it is necessary to replace the server, including the data. If the stored data are corrupt or erroneous, it is necessary to reinitialize the computer.

If the computer is an autonomous server, for example an aircraft server, the server is reinitialized or exchanged by a maintenance team, which checks the last version and the state of the server data and if appropriate reinitializes or exchanges the server. However, both the reinitialization and the exchange of a server are usually associated with a not inconsiderable time involvement. If the server is an autonomous server in an autonomous system or in an autonomous network, this necessary maintenance time is not always available. If the server is in an aircraft, for example, a server can be reinitialized or exchanged only on the ground, for example when the aircraft is at an intermediate stop. The typical time window for such a ground stop for performing reinitialization, exchange or maintenance of the server is usually only less than 45 minutes in that case. Since a maintenance team needs to board the aircraft, perform the maintenance operation and then leave the aircraft again in this time, the effective time which is available for performing the reinitialization or possibly exchange of the server is even less. In many cases, the time-intensive maintenance operations cannot be performed in full within the given time window. Furthermore, the maintenance work on the server needs to be performed by the maintenance engineers under considerable time pressure, which means that this can result in errors. If the service engineers do not manage necessary reinitialization or exchange of an aircraft server in the available period of time, the departure time is sometimes delayed. If this results in an aircraft missing the departure time slot available to the airline, it has to wait for the next time slot for departure, which means that sometimes further delays also arise.

It is therefore an object of the present invention to provide an apparatus and a method for reliably booting an autonomous server which involve reinitialization of the server being completed within a short period of time.

SUMMARY OF THE INVENTION

The invention provides an exchangeable memory unit for booting a server having a non-writable memory, which stores a bootloader and reference installation files, and having a writable secondary memory, which is provided for the purpose of storing installation files, wherein the bootloader checks a data content of the secondary memory and a data content of a primary memory of the server and loads the data content of the secondary memory into the primary memory in order to boot the server provided that the secondary memory is not empty and the primary memory is either empty or has a different data content from the secondary memory.

In one embodiment of the memory unit according to the invention, the bootloader copies the reference installation files from the non-writable memory of the exchangeable memory unit to the primary memory of the server provided that the secondary memory of the memory unit and the primary memory of the server are empty.

In one embodiment of the memory unit according to the invention, the bootloader checks a data content of the primary memory for data corruption provided that the primary memory of the server is not empty.

In one embodiment of the memory unit according to the invention, the bootloader copies the data content of the secondary memory of the exchangeable memory unit to the primary memory in order to boot the server provided that the secondary memory is not empty.

In one embodiment of the memory unit according to the invention, the bootloader copies the reference installation files from the non-writable memory area of the exchangeable memory unit to the primary memory of the server if the bootloader finds data corruption in the data stored in the non-empty primary memory of the server and provided that the secondary memory of the exchangeable memory unit is empty.

In one embodiment of the memory unit according to the invention, the bootloader stored in the non-writable memory of the exchangeable memory unit is called by a BIOS program which is stored in a non-volatile memory of the server and which is activated when the server is started.

The invention provides a server having at least one exchangeable memory unit which has a non-writable memory, which stores a bootloader and reference installation files, and a writable secondary memory, which is provided for the purpose of storing installation files, wherein the bootloader checks a data content of the secondary memory and a data content of a primary memory of the server and loads the data content of the secondary memory into the primary memory in order to boot the server provided that the secondary memory is not empty and the primary memory is either empty or has a different data content from the secondary memory.

In one embodiment of the server according to the invention, the primary memory of the server stores reference installation files which are automatically copied from a non-writable memory area of an exchangeable memory unit which has been is inserted into the server or which are stored when the server is configured.

In one embodiment of the server according to the invention, the server is connected to an autonomous local area network.

In one possible embodiment of the server according to the invention, the server is an aircraft server for an autonomous aircraft system.

In one embodiment of the server according to the invention, the primary memory is an internal hard disk of the server.

The invention also provides a method for booting a server having the following steps:
a) a data content of a primary memory of the server and of a secondary memory of an exchangeable memory unit which has been connected to the server is checked by a bootloader which is stored in a non-writable memory of the memory unit which has been connected to the server; and
b) the data content of the secondary memory is copied to the primary memory in order to boot the server provided that the secondary memory is not empty and the primary memory is either empty or has a different data content from the secondary memory.

In one embodiment of the method according to the invention, the bootloader copies reference installation files from the non-writable memory of the memory unit to the primary memory of the server provided that the secondary memory of the memory unit and the primary memory of the server are empty.

In one embodiment of the method according to the invention, the bootloader checks a data content of the primary memory for data corruption provided that the primary memory of the server is not empty.

In one embodiment of the method according to the invention, the bootloader copies the data content of the secondary memory to the primary memory in order to boot the server if the bootloader finds data corruption in the data stored in the non-empty primary memory of the server and provided that the secondary memory is not empty.

In one embodiment of the method according to the invention, the bootloader copies the reference installation files from the non-writable memory of the memory unit to the primary memory of the server if the bootloader finds data corruption in the data stored in the non-empty primary memory of the server and provided that the secondary memory is empty.

In one embodiment of the method according to the invention, the bootloader stored in the non-writable memory of the exchangeable memory unit is called by a BIOS program which is stored in a non-volatile memory of the server and which is activated when the server is started.

In one embodiment of the method according to the invention, the bootloader is executed by a computation unit of the server or by a computation unit of the exchangeable memory unit.

The invention also provides a computer program having program demands for carrying out a method for booting a server having the following steps:
a) a data content of a primary memory of the server and of a secondary memory of an exchangeable memory unit which has been connected to the server is checked by a bootloader which is stored in a non-writable memory of the memory unit which has been connected to the server; and
b) the data content of the secondary memory is copied to the primary memory in order to boot the server provided that the secondary memory is not empty and the primary memory is either empty or has a different data content from the secondary memory.

The invention also provides a data storage medium which stores a computer program of this kind.

Embodiments of the method according to the invention and of the apparatus according to the invention for booting an autonomous server are described below with reference to the appended figures in order to explain features of the invention.

BRIEF DESCRIPTION OF THE FIGURES

In the figures:

FIG. 4 shows a flowchart of an exemplary embodiment of the method according to the invention for booting a server.

DETAILED DESCRIPTION OF THE FIGURES

Figure 1:
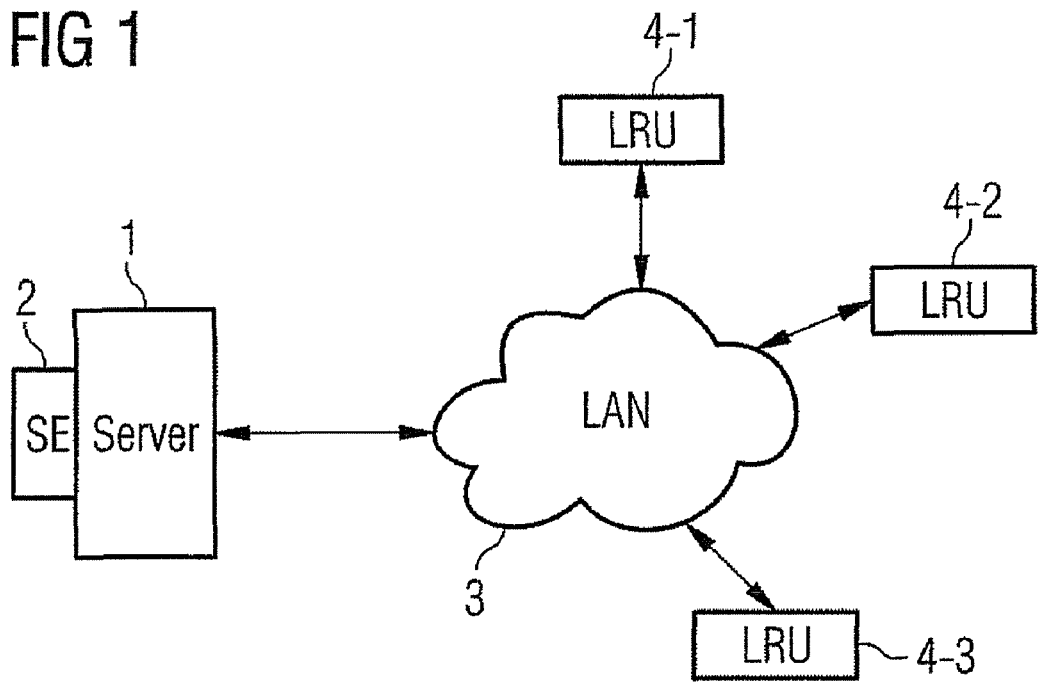
FIG. 1 shows a block diagram of an autonomous local area network with a server according to the invention into which an exchangeable memory unit has been inserted.

As can be seen from FIG. 1, a server 1 according to the invention in one possible embodiment forms a portion of an autonomous local area network, with at least one exchangeable memory unit 2 being inserted into the server 1. By way of example, the server 1 is an autonomous aircraft server within an aircraft. In the case of the exemplary embodiment shown in FIG. 1, said server is connected to one or more exchangeable units 4 via a local area network 3. These exchangeable units are LRU (Line Replaceable Unit) units within an aircraft, for example. The exchangeable memory unit 2 which can be inserted into the server 1 may be a memory card or a USB memory stick, for example.

Figure 2:
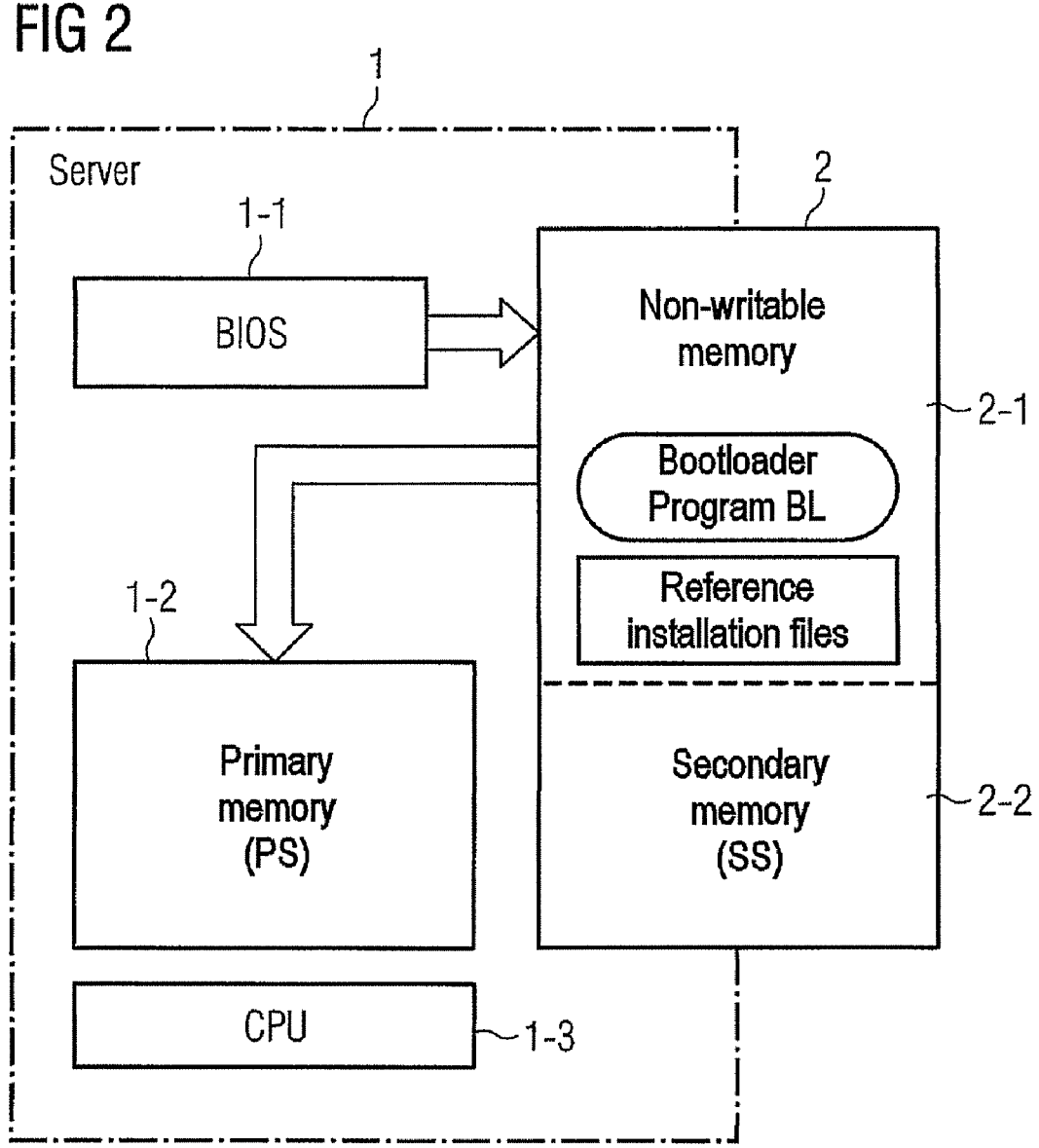
FIG. 2 shows a block diagram to explain the method according to the invention for booting the server.

FIG. 2 shows the server 1 and the memory unit 2 inserted into the latter via an interface in detail. Besides other units, such as program memories or power supply units, the server 1 contains a non-volatile memory 1-1 for storing a BIOS program. Furthermore, the server 1 contains a primary memory 1-2 which stores an operating system OS for operating the server 1. In addition, the server 1 contains at least one microprocessor or a CPU 1-3 for executing programs. The exchangeable memory unit 2 for booting the server 1 has a non-writable memory 2-1 and a writable secondary memory 2-2. The non-writable memory 2-1 of the exchangeable memory unit 2 stores a bootloader program or a bootloader BL and also reference installation files. The writable secondary memory 2-2 of the exchangeable memory unit 2 is provided for the purpose of storing installation files. In one possible embodiment, the exchangeable memory unit 2 is a compact flash memory card which can be plugged in in the server 1.

The bootloader BL stored in the non-writable memory 2-1 of the exchangeable memory unit 2 is called by the BIOS program, which is stored in the non-volatile memory 1-1 of the server and which is activated when the server 1 is started. In addition, the BIOS has a pointer address or a pointer to the non-writable memory 2-1 of the memory unit 2, for example.

The bootloader BL stored in the non-writable memory 2-1 is called by the BIOS and is executed as a program by the CPU 1-3 of the server 1. The bootloader BL checks the data content of the secondary memory 2-2 and the data content of the primary memory 1-2 of the server 1. Provided that the secondary memory 2-2 is not empty and the primary memory 1-2 of the server 1 is either empty or has a different data content from the secondary memory 2-2, the bootloader BL loads the data content of the secondary memory 2-2 of the exchangeable memory unit 2 into the primary memory 1-2 of the server 1. The primary memory 1-2 is a hard disk of the server 1, for example.

If both the secondary memory 2-2 (second repository) of the exchangeable memory unit 2 and the primary memory 1-2, that is to say the hard disk of the server 1, are empty, the bootloader BL copies the reference installation files stored in the non-writable memory 2-1 of the exchangeable memory unit 2 to the primary memory 1-2 of the server 1.

Figure 3:
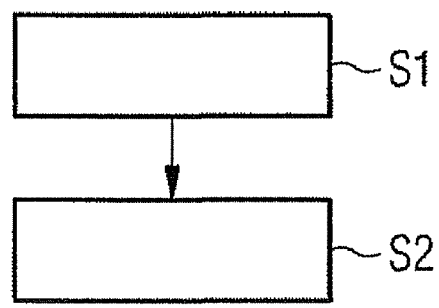
FIG. 3 shows a simple flowchart to illustrate the method according to the invention for booting a server.

The bootloader BL called by the BIOS first of all checks a data content of the primary memory or of the hard disk 1-2 for data corruption provided that the primary memory 1-2 of the server 1 is not empty. Provided that the bootloader BL finds data corruption in the data stored in the non-empty primary memory 1-2 of the server 1, the bootloader BL copies the data content of the secondary memory 2-2 of the exchangeable memory unit 2 to the primary memory 1-2 in order to boot the server 1 provided that the secondary memory 2-2 is not empty. If, conversely, the bootloader BL admittedly finds data corruption in the data stored in the non-empty primary memory 1-2 of the server 1 but the secondary memory 2-2 is empty, the bootloader BL copies the reference installation files from the non-writable memory area 1-2 of the exchangeable memory unit 2 to the primary memory 1-2 of the server 1. In this way, if data corruption is recognized then reinitialization is performed from the memory unit 2 with the most up-to-date software version FIG. 3 shows a simple flowchart for the method according to the invention for booting an autonomous server 1.

In a step S1, the data content of the primary memory 1-2, for example the hard disk of the server 1, and of a secondary memory 2-2 in a memory unit 2 which has been inserted into the server 1 is checked by the bootloader BL which is stored in the non-writable memory 2-1 of the memory unit 2 inserted in the server 1.

In a further step S2, the data content of the secondary memory 2-2 is copied to the primary memory 2-1 in order to boot the server 1 provided that the secondary memory 2-2 is not empty and the primary memory 1-2 is either empty or has a different data content from the secondary memory 2-2.

FIG. 4 shows an exemplary embodiment of the method according to the invention for booting a server 1.

When the server 1 has been switched on, a boot start takes place in step SO, this involving the BIOS program stored in the non-volatile memory 1-1 activating the bootloader BL stored in the non-writable memory 2-1 of the inserted memory unit 2. The bootloader BL or the bootloader program performs various procedures and actions. The bootloader BL uses various information to determine the various actions to be performed. Firstly, the bootloader BL uses data about the loading state of the server 1, namely whether the primary memory 1-2 of the server 1 is empty or loaded and whether there may be any corruption in the data. In addition, is the bootloader BL uses data about the state of the exchangeable memory unit 2 and checks whether it is a memory unit 2 directly after delivery or a loaded memory unit 2.

In step S1, the bootloader BL first of all checks whether the primary memory 1-2 of the server 1 is empty or is filled with data. If the primary memory 1-2 of the server 1 contains data, a check is also performed to determine whether the data are error-free or corrupt. If it is established in step S2 that the data stored in the primary memory 1-2 are corrupt or erroneous, a check is performed in step S3 to determine whether or not the secondary memory 2-2 of the exchangeable memory unit 2 is empty. If the secondary memory 2-2 of the exchangeable memory unit 2 is empty, that is to say that if both the primary memory 1-2 and the secondary memory 2-2 are empty, then it is a new server in which the exchangeable memory unit 2 has also not been preinstalled. In this case, the bootloader program BL copies the reference installation files from the non-writable memory 2-1 of the memory unit 2 to the primary memory 1-2, for example to the hard disk of the server 1.

If it is established in step S2 that the data stored on the non-empty primary memory 1-2 are error-free or incorrupt, a check is performed by the bootloader BL in a further step S5 to determine whether or not the secondary memory 2-2 of the inserted memory unit 2 is empty. If the secondary memory 2-2 is not empty, there is therefore both a non-empty primary memory and a non-empty secondary memory, and a check is performed in a further step S6 to determine whether or not the data content of the primary memory 1-2 and of the secondary memory 2-2 is the same. If the data content of the secondary memory 2-2 differs from the data content of the primary memory 1-2, the inserted memory unit is a freshly inserted memory unit 2, which means that it is assumed that the data content of the secondary memory 2-2 is more up-to-date than the data content of the primary memory 1-2. In this case, the bootloader BL copies the data content of the secondary memory 2-2 to the primary memory 1-2 in step S7 and overwrites the data which are already present therein. Conversely, if the data content of the primary memory 1-2 and of the secondary memory 2-2 is the same, such overwriting and/or copying can be dispensed with. In addition, the data content of the secondary memory 2-2 is copied to the primary memory 1-2 if the primary memory 1-2 is empty and if it is established in step S3 that the secondary memory 2-2 of the memory unit 2 is not empty. Following the copying operations possibly performed in steps S4, S7, booting takes place in step S8 on the basis of the data stored in the primary memory 1-2. The operation ends in step S9.

The method according to the invention ensures rapid and safe booting of a server 1, particularly of an autonomous server, as is present in an aircraft, for example. The exchangeable memory unit 2 always contains the last (up to date) or most current version of the required data, particularly of the required operating system. This means that if the server 1 is faulty, that is to say particularly that the data in the primary memory 1-2 or on the hard disk are corrupt, it is merely necessary to exchange a hardware unit, that is to say the exchangeable memory unit 2. The data are loaded automatically when the server 1 is initialized as a result of triggering by the BIOS program, which is stored in the non-volatile memory 1-1 of the server 1 and activates the bootloader BL.

If the data are corrupt, the procedure is the same. The error-free data are then loaded onto the server 1 from the secondary memory 2-2 by the bootloader BL. If errors occur on an autonomous server 1, particularly on an autonomous server inside an aircraft, which necessitate reinitialization, it is merely necessary for a member of maintenance staff to replace the memory unit 2 which has been inserted into the server 1 with an updated memory unit 2 which contains a current version of the software in its secondary memory 2-2. The exchangeable memory unit 2 can be replaced within a relatively short period of a few minutes. It is therefore possible to form the reinitialization within a relatively short time window in which an aircraft is on the ground at an intermediate stop. In one possible embodiment, the exchangeable memory unit 2 is a compact flash memory card. In an alternative embodiment, the exchangeable memory unit 2 may also be a different data storage memory, for example a USB stick.

In one possible embodiment, the bootloader BL is executed by a computation unit or a CPU 1-3 in the server 1. In a possible further embodiment, the exchangeable memory unit 2 for its part has a computation unit and/or a microprocessor for executing the bootloader BL.

In a further possible embodiment, the exchangeable memory unit 2 is in a mobile maintenance appliance which can be connected to the server 1 via an interface for is the purpose of reinitializing the server 1. By way of example, this mobile maintenance appliance is a portable notebook which contains a nonwritable memory 2-1 and a writable secondary memory 2-2.

In a further possible embodiment, the exchangeable memory unit 2 is placed into a data reader of a mobile maintenance appliance of this kind.

In one possible embodiment, a mobile maintenance appliance of this kind containing a memory unit 2 has a user interface which informs the user of various installation variants as are shown in FIG. 4, for example, the user being able to control the installation operation by means of inputs.

By way of example, in a first installation variant the user learns that the data stored in the primary memory 1-2 are not corrupt and the secondary memory 1-2 of the inserted memory unit is empty. In this case, booting takes place in the primary memory 1-2.

In a second installation variant, the user or the maintenance staff is notified that the data stored in the primary memory 1-2 are different from the data stored in the secondary memory 2-2, and therefore the booting after a copying operation for the data to the primary memory is effected on the basis of the data stored in the secondary memory 2-2.

In a further installation variant, the maintenance engineer is notified that the data stored in the primary memory 1-2 are erroneous or corrupt and that a copying operation for the data from the secondary memory 2-2 to the primary memory 1-2 and booting are taking place on the basis of the data stored in the secondary memory 2-2.

In a further installation variant, the engineer receives the message that the data stored in the primary memory 1-2 are erroneous or corrupt and that the storage medium 2 which has been inserted into the secondary memory 2-2 is empty. In this case, the engineer receives the message that reference installation files are being copied from the nonwritable memory error 2-1 to the primary memory 1-2 and are being used for booting.

In this way, the engineer or the user has the option of monitoring the boot operation or the various boot variants. There are various possibilities for varying embodiments of the method according to the invention. By way of example, after a copying operation in step S4 or in step S7, a further checking operation can be performed to determine whether the data copied to the primary memory 1-2 are error-free or corrupt. Only then is the booting effected in step S8 on the basis of the copied data.

In the variant embodiment shown in FIG. 4, the booting is effected on the basis of the data stored in or copied to the primary memory 1-2 in step S8. If it is established that the primary memory 1-2 itself is erroneous, for example on the basis of data corruption being established a plurality of times, a further embodiment can involve the booting also being effected directly on the basis of the data stored in the secondary memory 2-2. In this case, the primary memory 1-2, for example the hard disk of the server 1, is exchanged at a later time, for example at an overnight stop for the aircraft.

There are various ways of checking the data to determine whether they are corrupt or erroneous. In one possible embodiment, the data are thoroughly checked by means of checksums to determine whether they are corrupt, for example are infected by a virus. In addition, it is possible to check whether the stored data are in a well-formed state.

Normally, the primary memory 1-2 is not empty and the data contained therein are not corrupt. In addition, the secondary memory 2-2 of the inserted memory unit is usually likewise not empty. Normally, a check is therefore performed in step S6 to determine whether the data content of the primary memory 1-2 and of the secondary memory 2-2 is the same, and in the event of a difference the data content of the insertable memory unit 2, which can be exchanged manually, is used.

In one possible variant embodiment, the exchangeable memory unit 2 can be exchanged or inserted only in a particular operating state, for example when the aircraft is on the ground.

In a further possible embodiment, the boot operation is preceded by authentication of the memory unit 2 to the server 1. As soon as the insertable memory unit 2 has authenticated itself to the server 1, the relevant boot operation for the server 1 is initiated.

The server 1 shown in FIG. 2 may be any autonomous server. By way of example, the server 1 may serve multimedia appliances in an aircraft onboard system. A further example of an autonomous server is a server for the cabin crew which provides documents or manuals.

In a further embodiment, a plurality of cloned memory units 2 are inserted into the server 1. In this way, it is possible to further reduce the probability of failure for both the exchangeable memory unit 2 and the server 1, particularly the primary memory thereof, failing simultaneously.

In a further variant embodiment, the server 1 performs a check of its data stored in the primary memory 1-2 during flight. If the data are assessed as being corrupt or erroneous, the server transmits a message to a maintenance server in the area of the next intermediate stop while in flight. In this way, the exchangeable memory unit 2 can be prepared by writing the relevant installation files to the secondary memory 2-2. The current exchangeable memory unit 2 is then inserted into the server 1 by the maintenance staff on the ground after removing the previous memory unit 2 when the aircraft has landed.

What claimed is:

1. An exchangeable memory unit for booting a server having a non-writable memory, which stores a bootloader and reference installation files, and having a writable secondary memory, which is provided for the purpose of storing installation files, wherein said bootloader checks a data content of the secondary memory and a data content of a primary memory of said server and loads the data content of the secondary memory into said primary memory in order to boot said server provided that said secondary memory is not empty and said primary memory is either empty or has a different data content from said secondary memory, wherein said primary memory comprises a hard disk of the server.

2. The memory unit according to claim 1, wherein said bootloader copies the reference installation files from said non-writable memory of said exchangeable memory unit to said primary memory of the server provided that the secondary memory of the memory unit and the primary memory of the server are empty.

3. The memory unit according to claim 2, wherein said bootloader checks a data content of said primary memory for data corruption provided that said primary memory of the server is not empty.

4. The memory unit according to claim 3, wherein if said bootloader finds data corruption in the data stored in the non-empty primary memory of the server then the bootloader copies the data content of the secondary memory of the exchangeable memory unit to said primary memory in order to boot the server provided that said secondary memory is not empty.

5. The memory unit according to claim 4, wherein if said bootloader finds data corruption in the data stored in the non-empty primary memory of the server then said bootloader copies the reference installation files from the non-writable memory area of the exchangeable memory unit to the primary memory of the server provided that the secondary memory is empty.

6. The memory unit according to claim 5, wherein said bootloader stored in the non-writable memory of the exchangeable memory unit is called by a BIOS program which is stored in a non-volatile memory of the server and which is activated when the server is started.

7. A server comprising at least one exchangeable memory unit which has a non-writable memory, which stores a bootloader and reference installation files, and a writable secondary memory, which is provided for the purpose of storing installation files,
wherein said bootloader checks a data content of the secondary memory and a data content of a primary memory of said server and loads the data content of said secondary memory into said primary memory in order to boot said server provided that said secondary memory is not empty and said primary memory is either empty or has a different data content from said secondary memory,
wherein said primary memory comprises a hard disk of the server.

8. The server according to claim 7, wherein said primary memory of the server stores reference installation files which are automatically copied from a non-writable memory area of an exchangeable memory unit which has been inserted into the server or which are stored when the server is configured.

9. A method for booting a server having the following steps:
a) a data content of a primary memory of the server, which comprises a hard disk of the server, and of a secondary memory of a memory unit which has been inserted into the server is checked by a bootloader which is stored in a non-writable memory of the memory unit which has been inserted into the server; and
b) the data content of the secondary memory is copied to the primary memory in order to boot the server provided that the secondary memory is not empty and the primary memory is either empty or has a different data content from the secondary memory.

10. The method according to claim 9, wherein said bootloader copies reference installation files from the non-writable memory of the inserted memory unit to the primary memory of the server provided that the secondary memory of the memory unit and the primary memory of the server are empty.

11. The method according to claim 10, wherein said bootloader checks a data content of a primary memory for data corruption provided that the primary memory of the server is not empty.

12. The method according to claim 11, wherein if said bootloader finds data corruption in the data stored in the non-empty primary memory of the server then the bootloader copies the data content of the secondary memory to the primary memory in order to boot the server provided that the secondary memory is not empty.

13. The method according to claim 12, wherein if said bootloader finds data corruption in the data stored in the non-empty primary memory of the server then the bootloader copies the reference installation files from the non-writable memory of the memory unit to the primary memory of the server provided that the secondary memory is empty.

14. The method according to claim 13, wherein said bootloader stored in the non-writable memory of the inserted memory unit is called by a BIOS program which is stored in a non-volatile memory of the server and which is activated when the server is started.

15. The method according to claim 9, wherein said bootloader is executed by a computation unit of the server or by a computation unit of the insertable memory unit.

* * * * *